United States Patent [19]
Reitz

[11] Patent Number: 5,617,597
[45] Date of Patent: Apr. 8, 1997

[54] MULTIPURPOSE KITCHEN TOOL

[76] Inventor: David Reitz, 357 Calvert Cir., Kennett Square, Pa. 19348

[21] Appl. No.: 618,355

[22] Filed: Mar. 19, 1996

[51] Int. Cl.⁶ .................................................. B25F 1/00
[52] U.S. Cl. ........................... 7/113; 7/110; 7/118; 7/156
[58] Field of Search .............................. 7/110, 113, 118, 7/138, 142, 151, 156, 158

[56] References Cited

U.S. PATENT DOCUMENTS 1,811,982  6/1931  Soustre ...................................... 7/156 X

FOREIGN PATENT DOCUMENTS 438715  3/1912  France ........................................ 7/118
355892  9/1931  United Kingdom ....................... 7/118

Primary Examiner—James G. Smith

[57] ABSTRACT

A multipurpose kitchen tool includes a housing having an upper end, a lower end, a front edge, a rear edge, and two side walls. The upper end has an opening formed in a central portion thereof extending into a channel through the housing. One of the two side walls has a hexagonal opening formed therein extending into the channel. A thermostat has an elongated shaft slidably received within the channel of the housing through the opening in the upper end thereof.

6 Claims, 4 Drawing Sheets

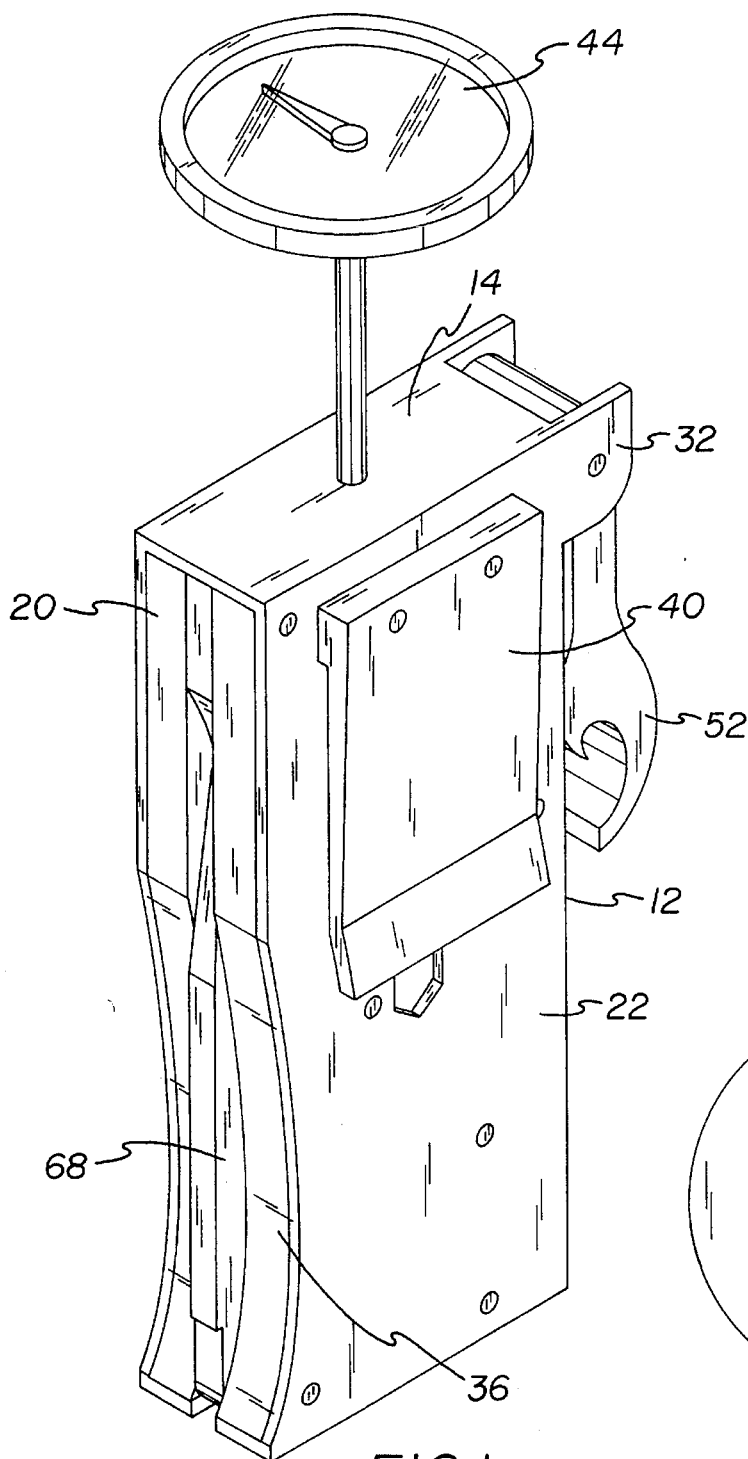
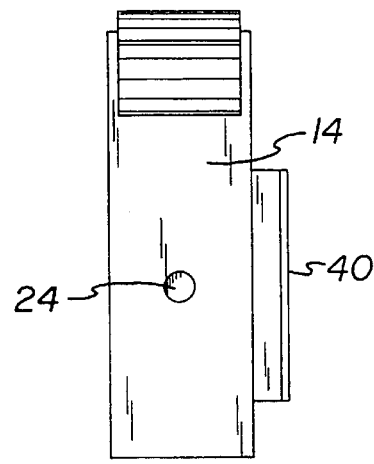
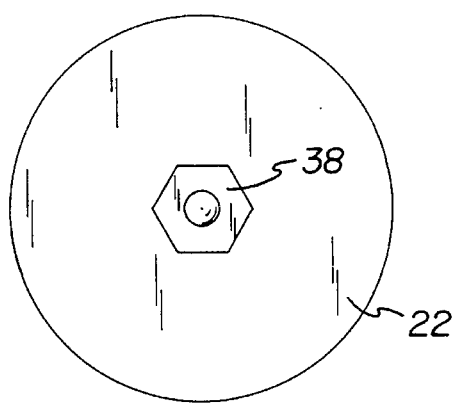

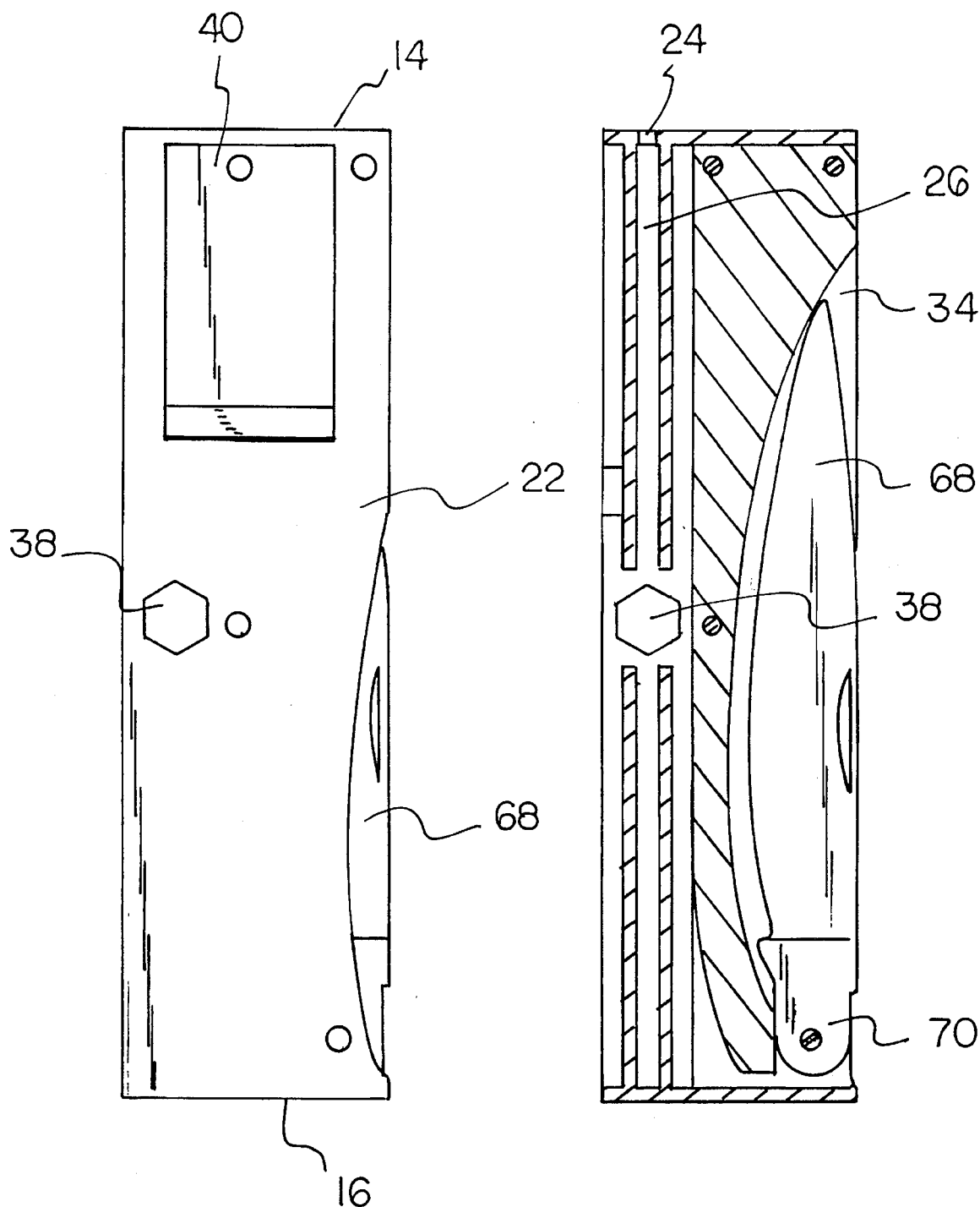

MULTIPURPOSE KITCHEN TOOL

BACKGROUND OF THE INVENTION

1. Field of the Invention

The present invention relates to a multipurpose kitchen tool and more particularly pertains to enabling performance of a number of tasks within a kitchen with a multipurpose kitchen tool.

2. Description of the Prior Art

The use of thermometers for measuring temperatures of cooked foods is known in the prior art. More specifically, measuring temperatures of cooked foods heretofore devised and utilized for the purpose of U.S. Pat. No. 4,134,299 to Rueger discloses a cooking thermometer.

Thermometers are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 297,819 to Cacciatore discloses the ornamental design for a thermometer or similar article.

U.S. Pat. No. Des. 317,130 to Berney discloses the ornamental design for a thermometer for testing wine temperatures.

U.S. Pat. No. 5,195,500 to Lerner discloses an oven device.

U.S. Pat. No. Des. 309,579 to Cross discloses the ornamental design for a thermometer.

U.S. Pat. No. Des. 283,601 to Fuller et al. discloses the ornamental design for a thermometer.

While these devices fulfill their respective, particular objective and requirements, the aforementioned patents do not describe a multipurpose kitchen tool for enabling performance of a number of tasks within a kitchen.

In this respect, the multipurpose kitchen tool according to the present invention substantially departs from the conventional concepts and designs of the prior art, and in doing so provides an apparatus primarily developed for the purpose of enabling performance of a number of tasks within a kitchen.

Therefore, it can be appreciated that there exists a continuing need for new and improved multipurpose kitchen tool which can be used for enabling performance of a number of tasks within a kitchen. In this regard, the present invention substantially fulfills this need.

SUMMARY OF THE INVENTION

In the view of the foregoing disadvantages inherent in the known types of measuring temperatures of cooked foods now present in the prior art, the present invention provides an improved multipurpose kitchen tool. As such, the general purpose of the present invention, which will be described subsequently in greater detail, is to provide a new and improved multipurpose kitchen tool and method which has all the advantages of the prior art and none of the disadvantages.

To attain this, the present invention essentially comprises a housing Having a generally rectangular configuration. The housing has an upper end, a lower end, a front edge, a rear edge, and two side walls. The upper end has an opening formed in a central portion thereof extending into a channel through the housing. The front edge has a recess formed in a lower portion thereon. The lower portion has a finger recess formed in an outer edge thereof. An upper portion of the front edge has a securement bracket integral therewith. The rear edge has an elongated recess formed therein extending from the upper end to the lower end of the housing. A lower portion of the rear edge has an indentation formed therein. One of the two side walls has a hexagonal opening formed therein extending into the channel. One of the two side walls has a belt clip secured thereto. The device includes a thermostat having an elongated shaft. The elongated shaft is slidably received within the channel of the housing through the opening in the upper end thereof. The device includes a bottle opener having a proximal end pivotally coupled with the securement bracket of the front edge of the housing. The bottle opener has a distal end adapted for opening bottles. The device includes a cork screw having a proximal end pivotally secured within the recess formed in the lower portion of the front edge of the housing. The cork screw has a distal end adapted for removal of corks from wine bottles. The device includes a knife blade having a proximal end pivotally secured within the recess formed in the rear edge of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved multipurpose kitchen tool which has all the advantages of the prior art measuring temperatures of cooked foods and none of the disadvantages.

It is another object of the present invention to provide a new and improved multipurpose kitchen tool which may be easily and efficiently manufactured and marketed.

It is a further object of the present invention to provide a new and improved multipurpose kitchen tool which is of durable and reliable construction.

An even further object of the present invention is to provide a new and improved multipurpose kitchen tool which is susceptible of a low cost of manufacture with regard to both materials and labor, and which accordingly is then susceptible of low prices of sale to the consuming public, thereby making such a multipurpose kitchen tool economically available to the buying public.

Still yet another object of the present invention is to provide a new and improved multipurpose kitchen tool which provides in the apparatuses and methods of the prior art some of the advantages thereof, while simultaneously overcoming some of the disadvantages normally associated therewith.

Even still another object of the present invention is to provide a new and improved multipurpose kitchen tool for enabling performance of a number of tasks within a kitchen.

Lastly, it is an object of the present invention to provide a new and improved multipurpose kitchen tool includes a housing having an upper end, a lower end, a front edge, a rear edge, and two side walls. The upper end has an opening formed in a central portion thereof extending into a channel through the housing. One of the two side walls has a hexagonal opening formed therein extending into the channel. A thermostat has an elongated shaft slidably received within the channel of the housing through the opening in the upper end thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the multipurpose kitchen tool constructed in accordance with the principles of the present invention.

FIG. 2 is a plan view of the preferred embodiment of the present invention.

FIG. 3 is a front view of the present invention illustrating the adjustment aperture.

FIG. 8 is a side elevation view of a second embodiment of the present invention.

FIG. 9 is a side elevation view of the second embodiment shown in cross-section.

The same reference numerals refer to the same parts through the various Figures.

DESCRIPTION OF THE PREFERRED EMBODIMENT

Figure 4:
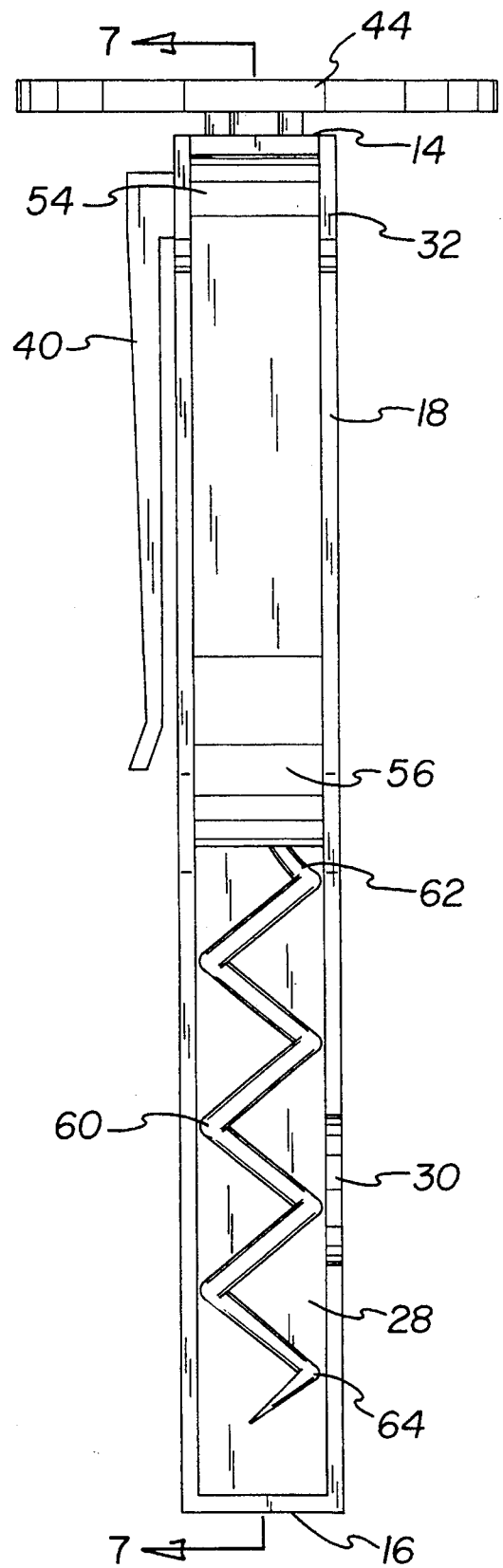
FIG. 4 is a front elevation view of the present invention.
Figure 5:
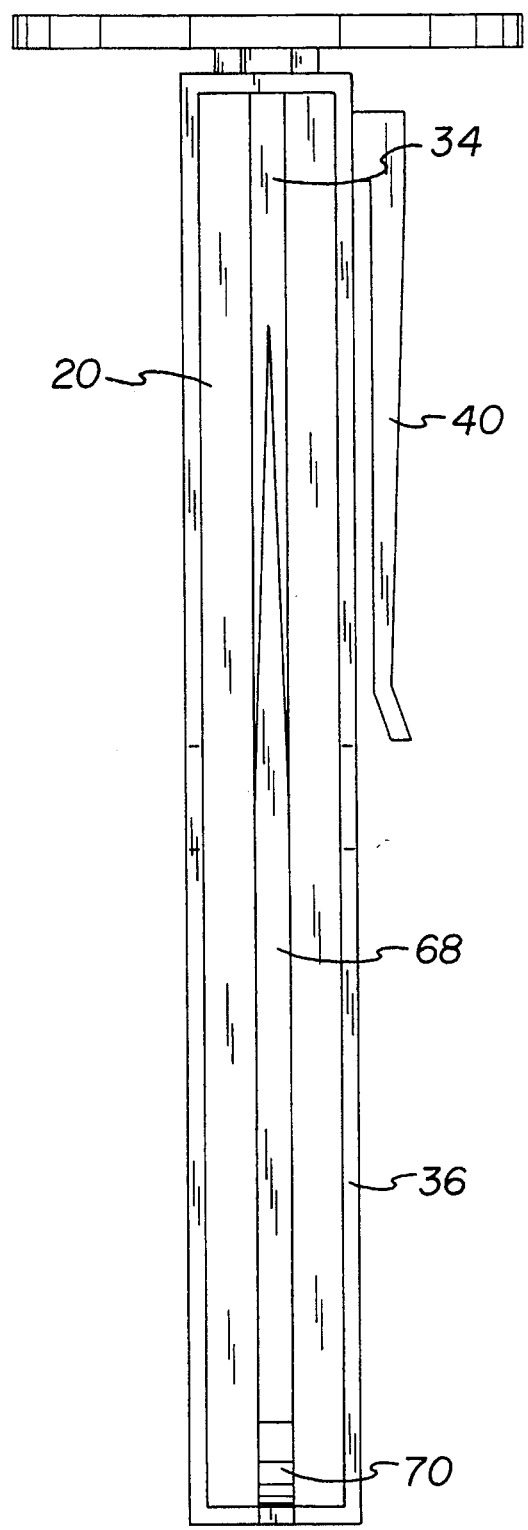
FIG. 5 is a rear elevation view of the present invention.
Figure 7:
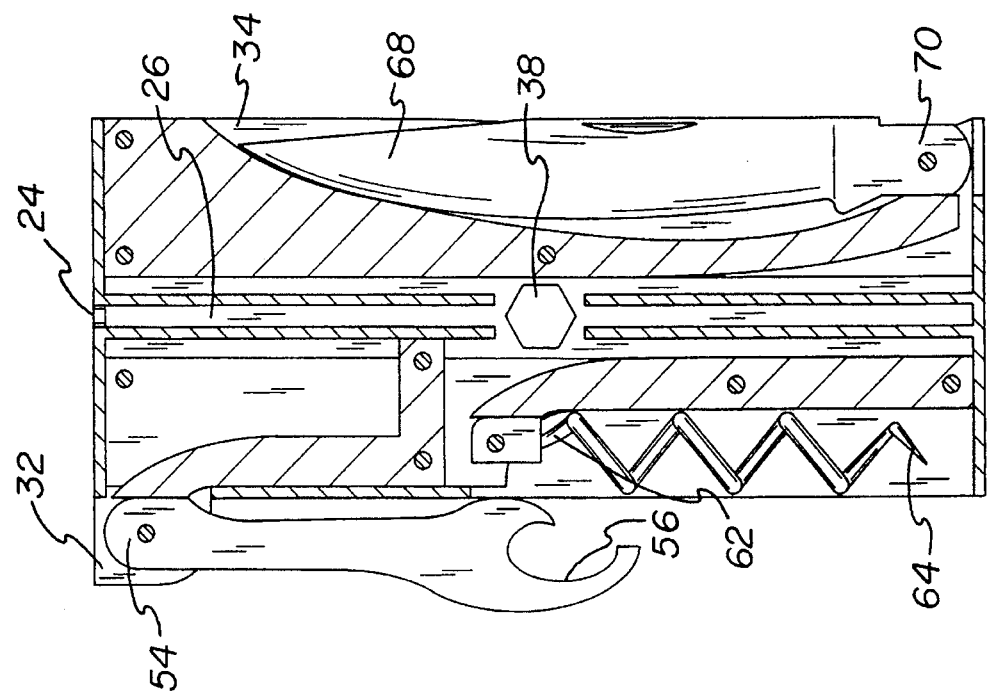
FIG. 7 is a cross-sectional view as taken along line 7—7 of FIG. 4.
Figure 6:
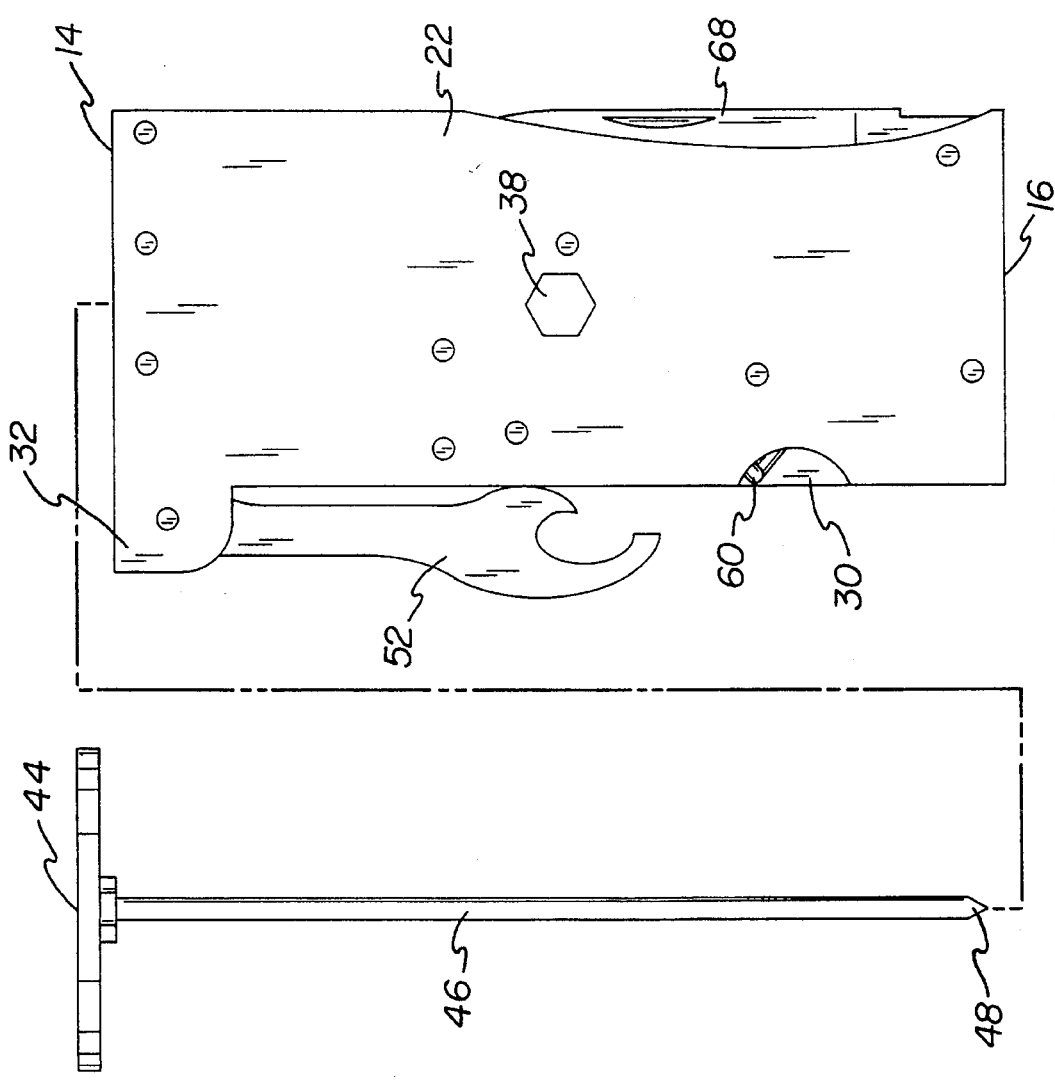
FIG. 6 is a side elevation view of the present invention.

With reference now to the drawings, and in particular, to FIGS. 1–9 thereof, the preferred embodiment of the new and improved multipurpose kitchen tool embodying the principles and concepts of the present invention and generally designated by the reference number 10 will be described.

Specifically, it will be noted in the various Figures that the device relates to a new and improved multipurpose kitchen tool for enabling performance of a number of tasks within a kitchen. In its broadest context, the device consists of a housing, a thermostat, a bottle opener, a cork screw, and a knife blade. Such components are individually configured and correlated with respect to each other so as to attain the desired objective.

The device 10 includes a housing 12 having a generally rectangular configuration. The housing 12 has an upper end 14, a lower end 16, a front edge 18, a rear edge 20, and two side walls 22. The upper end 14 has an opening 24 formed in a central portion thereof extending into a channel 26 through the housing 12. The front edge 18 has a recess 28 formed in a lower portion thereof. The lower portion has a finger recess 30 formed in an outer edge thereof. An upper portion of the front edge 18 has a securement bracket 32 integral therewith. The rear edge 20 has an elongated recess 34 formed therein extending from the upper end 14 to the lower end 16 of the housing 12. A lower portion the rear edge 20 has an indentation 36 formed therein. One of the two side walls 22 has a hexagonal opening 38 formed therein extending into the channel 26. One of the two side walls 22 has a belt clip 40 secured thereto.

The device 10 includes a thermostat 44 having an elongated shaft 46. The elongated shaft 46 is slidably received within the channel 26 of the housing 12 through the opening 24 in the upper end 12 thereof. The thermostat 44 is used to check the temperature of cooked foods. The shaft 46 is placed within the channel 26 of the housing 12. The housing 12 is then placed within a glass of ice water to calibrate the thermostat 44 to thirty-two degrees. The ice water will enter into the channel 26 through the hexagon opening 38 to properly maintain the effectiveness of the thermostat 44. The elongated shaft 46 has a pointed lower end 48 to pierce the foods to enable proper measurement of temperature by the thermostat 44.

Next, the device 10 includes a bottle opener 52 having a proximal end 54 pivotally coupled with the securement bracket 32 of the front edge 18 of the housing 12. The bottle opener 52 has a distal end 56 adapted for opening bottles. The bottle opener 52 extends about half of the length of the front edge 18 of the housing 12.

The device 10 includes a cork screw 60 having a proximal end 62 pivotally secured within the recess 28 formed in the lower portion of the front edge 18 of the housing 12. The cork screw 60 has a distal end 64 adapted for removal of corks from wine bottles. The finger recess 30 allows for a user to easily pivot the cork screw 60 upwardly to a position used to remove the corks from the wine bottles.

Lastly, the device 10 includes a knife blade 68 having a proximal end 70 pivotally secured within the recess 34 formed in the rear edge 20 of the housing 12. The indentation 36 allows a rear edge of the knife blade 68 to be pivoted outwardly for use thereof.

A second embodiment of the present invention is illustrated in FIGS. 8 and 9. This embodiment depicts the device 10 without the cork screw 60 or the bottle opener 52. The second embodiment does include the channel 26 to allow for the insertion of the thermostat 44 therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A multipurpose kitchen tool for enabling performance of a number of tasks within a kitchen comprising, in combination:

a housing having a generally rectangular configuration, the housing having an upper end, a lower end, a front edge, a rear edge, and two side walls, the upper end having an opening formed in a central portion thereof extending into a channel through the housing, the front edge having a recess formed in a lower portion thereon, the lower portion having a finger recess formed in an outer edge thereof, an upper portion of the front edge having a securement bracket integral therewith, the rear edge having an elongated recess formed therein extending from the upper end to the lower end of the housing, a lower portion of the rear edge having an indentation formed therein, one of the two side walls having a hexagonal opening formed therein extending into the channel, one of the two side walls having a belt clip secured thereto;

a thermostat having an elongated shaft, the elongated shaft slidably received within the channel of the housing through the opening in the upper end thereof;

a bottle opener having a proximal end pivotally coupled with the securement bracket of the front edge of the housing, the bottle opener having a distal end adapted for opening bottles;

a cork screw having a proximal end pivotally secured within the recess formed in the lower portion of the front edge of the housing, the cork screw having a distal end adapted for removal of corks from wine bottles;

a knife blade having a proximal end pivotally secured within the recess formed in the rear edge of the housing.

2. A multipurpose kitchen tool comprising:

a housing having an upper end, a lower end, a front edge, a rear edge, and two side walls, the upper end having an opening formed in a central portion thereof extending into a channel through the housing, one of the two side walls having a hexagonal opening formed therein extending into the channel;

a thermostat having an elongated shaft, the elongated shaft slidably received within the channel of the housing through the opening in the upper end thereof.

3. The kitchen tool as set forth in claim 2 and further including a bottle opener having a proximal end pivotally coupled with the front edge of the housing, the bottle opener having a distal end adapted for opening bottles.

4. The kitchen tool as set forth in claim 2 and further including a cork screw having a proximal end pivotally secured within a recess formed in the lower portion of the front edge of the housing, the cork screw having a distal end adapted for removal of corks from wine bottles.

5. The kitchen tool as set forth in claim 2 and further including a knife blade having a proximal end pivotally secured within a recess formed in the rear edge of the housing.

6. The kitchen tool as set forth in claim 2 and further including a belt clip secured to one of the two side walls of the housing.

\* \* \* \* \*